United States Patent [19]

Hara

[11] Patent Number: 4,506,417
[45] Date of Patent: Mar. 26, 1985

[54] FASTENER FOR STRING
[75] Inventor: Kunio Hara, Kawasaki, Japan
[73] Assignee: Nifco Inc., Yokohama, Japan
[21] Appl. No.: 492,275
[22] Filed: May 6, 1983
[51] Int. Cl.³ .............................................. F16G 11/00
[52] U.S. Cl. .................................. 24/115 G; 24/121; 24/129 A; 24/136 R; 24/266
[58] Field of Search ..................... 24/115 G, 119, 121, 24/127, 129 A, 136 R, 266

[56] References Cited
U.S. PATENT DOCUMENTS

| | | | |
|---|---|---|---|
| 796,908 | 8/1905 | Hall | 24/129 B |
| 914,768 | 3/1909 | Walker et al. | 24/129 A |
| 1,379,093 | 5/1921 | Freeberg | 24/115 G |
| 1,637,003 | 7/1927 | Lang | 24/115 G |
| 2,482,625 | 9/1949 | Kunkel | 24/115 G |
| 2,524,649 | 10/1950 | Buhler | 24/115 G |
| 3,080,867 | 3/1963 | Eichinger | 24/115 G |
| 3,271,510 | 9/1966 | Decker et al. | 24/115 G |
| 3,540,637 | 11/1970 | Ezell | 24/115 G |
| 3,813,737 | 6/1974 | Larsen | 24/121 |
| 4,328,605 | 5/1982 | Hutchison | 24/115 G |

Primary Examiner—Victor N. Sakran
Attorney, Agent, or Firm—J. R. Halvorsen; T. W. Buckman

[57] ABSTRACT

A fastener for securing in position a string to be used for gathering the skirt of a coat or the open edge of a pouch, for example, is constructed of a housing provided therein with a blind cavity, a sliding member admitted into the blind cavity of the housing, and a spring interposed between the housing and the sliding member; the housing and the sliding member being respectively provided laterally therein with perforations and insertion holes adapted to come into mutual coincidence when the sliding member is pushed into the housing against the energizing force of the spring. Since opposed end portions of a given string can be inserted sidewise through the coinciding insertion holes into the perforations, this string fastener can be used advantageously without requiring the opposed end portions of the string to be always kept in mutual contact. It imposes no limitation upon the length of the string to be tied and enjoys ease of handling.

7 Claims, 5 Drawing Figures

FASTENER FOR STRING

BACKGROUND OF THE INVENTION

This invention relates to a fastener for strings, used for conveniently tying in position those strings which are designed to brace, lace, and otherwise tighten various clothes and sacks.

The expedient of slidably attaching a string around the skirt of a jacket or a winter coat or around the free edge of a hood or similarly attaching a string around the open edge of a sack, a bag or other similar pouch, gathering the aforementioned skirt or open edge as slid on the string, and tying the innermost ends of the exposed portions of the string as opposed to each other thereby keeping the gathered skirt or open edge in its drawn condition is widespread. The work of tying the innermost ends of the string exposed from the gathered skirt or open edge and the work of undoing the tied ends of the string are both relatively troublesome. For small children, they are frequently either impossible or very difficult.

To avoid this troublesome task, there has been developed and adopted for actual use a fastener for strings, which by using a simple procedure instead of the troublesome procedure inherent to the conventional manner, brings about the same effect on the opposed portions of a string as attained when they are tied as described above. This improved string fastener comprises a tubular housing provided laterally therein with a perforation and axially therein with a blind hole opening in one end of the housing, a sliding member adapted to be slid into the interior of the housing and provided laterally therein with a perforation which perfectly coincides with the perforation of the housing when the sliding member is completely admitted into the housing, and a spring interposed between the housing and the sliding member for the purpose of keeping in an outwardly energized state the sliding member admitted into the interior of the housing. When the string fastener is left standing in its natural condition, the perforation of the sliding member which is kept outwardly energized by the spring deviates from the perforation of the housing instead of coinciding therewith. These deviating perforations, to permit smooth passage therethrough of the opposite ends of the string, must be brought into perfect coincidence by causing the sliding member to be pushed into the interior of the housing against the energizing force of the spring. Then by relieving the force exerted to keep the sliding member pushed into the interior of the housing, the end portions of the string thus passed through the coinciding perforations are secured in position in much the same way as though they were tied in the conventional manner.

When the improved string fastener is used on a string which is attached to a hood, for example, since this string is required to be in a length amply greater than the total length of the open edge of the hood and further since the work of passing the opposite ends of the string through the perforations in the string fastener is troublesome, this string fastener is generally used with the end portions of the string passed to some extent through the perforations thereof. When the user of the coat having this hood puts on the hood, therefore, he is inevitably required to endure the inconvenience of slipping his head through the looped string. Owing to this and other inconveniences, this improved string fastener has been used only for the purpose of tying open edges of pouches. Further, since this string fastener ties the opposed protions of the string by simply nipping the end portions of the string between the housing and the sliding member with the energizing force of the spring, there is a possibility that the nipped portions of the string will slip out of position when some unexpected external pulling force is exerted upon the string. Thus, the string fastener lacks reliability. When the energizing force of the spring is increased for the purpose of precluding such accidental slippage of the nipped portions of the string, the work of pushing the sliding member into the housing necessitates great toil on the part of the user even to the extent of depriving the string fastener of its practicability.

SUMMARY OF THE INVENTION

An object of the present invention is to provide a string fastener of simple and compact construction, which is made easy to use by enabling opposed end portions of a string to be readily parted and tied and which, at the same time, renders the string effectively usable in its shortest possible length and secures the opposed portions of the string in position with a force far greater than the force used in driving the sliding member into the housing during the use of the string fastener.

To accomplish the object described above according to the present invention, there is provided a string fastener which comprises a housing having a blind cavity, a sliding member adapted to be accommodated in the blind cavity of the housing, and a spring interposed between the housing and the sliding member. The housing and the sliding member are severally provided with perforations for passage of end portions of a string, which perforations are adapted so as to be brought into perfect mutual coincidence when the sliding member is pushed into the housing against the energizing force of the spring. Further, the housing and the sliding member are provided severally with insertion holes which are adapted to coincide with each other and jointly communicate with the aforementioned perforations when the sliding member is kept in its pushed condition.

The opposed end portions of a string are inserted sidewise through the coinciding insertion holes into the perforations while the sliding member is kept in its pushed condition. When the sliding member is relieved of its pushed condition, the string fastener ties the opposed end portions of the string because the perforations are caused by the energizing force of the spring to deviate from each other. When the upper and lower portions of each of the openings of the perforation in the opposite lateral sides of the sliding member are scraped to form vertically opposed depressions in the openings, the end portions of the string passed through the perforations of the housing and the sliding member are secured as bent in zigzag patterns along the aforementioned vertical depressions when the perforations are kept in their normal mutually deviating condition. Thus, the string is tied fast enough to withstand the pulling force exerted on the string.

Optionally the perforation of the sliding member may be divided by a horizontal partitioning piece into two vertical halves so that one of the vertical halves of the perforation will communicate with the insertion hole and the other vertical half is closed with the partitioning piece. In this modification, one of the opposed end portions of a string is passed through the closed cavity of the perforation and the other end portion is detachably laid through the cavity of the perforation which communicates with the insertion. Consequently, one end portion of the string is constantly kept fast in the string fastener.

The other objects and characteristic features of the present invention will become apparent to those skilled in the art as the disclosure is made in the following description of a preferred embodiment of the invention, as illustrated in the accompanying drawings.

DESCRIPTION OF THE PREFERRED EMBODIMENTS

Figure 1:
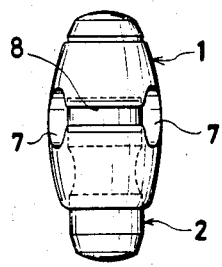
FIG. 1 is a front view of a typical string fastener of the present invention.

This invention relates to a fastener for a string to be used in binding clothes and pouches. The accompanying drawings illustrate one preferred embodiment of the present invention. The symbol 1 found in the drawings denotes a housing, which encloses a sliding member 2 and a coil spring 3. By 4 is denoted a string.

The housing 1 and the sliding member 2 are separately molded of thermoplastic synthetic resin and are joined as will be described in detail afterward.

The housing 1 in the present embodiment is molded in a vertically elongate elliptical shape. It is provided vertically therein with a blind cavity 5 which opens in one end of the housing for admitting the sliding member 2 therein.

The cavity 5 is formed as a tubular hole rising from the lower end of the housing along the axis of the housing. In the closed end of this cavity 5 near the upper end of the housing, a recess 6 for receiving one end of the coil spring 3 is formed.

In addition to the cavity 5, the housing 1 is provided with a perforation of a vertically elongate elliptic section which pierces the housing perpendicularly relative to the cavity 5. The elliptic section of this perforation 7 is large enough to permit passage of the opposed end portions of a string to be tied by the string fastener. The housing is further provided laterally therein with an insertion hole 8 which is formed so as to communicate with the perforation 7. The opposed end portions of the string, therefore, can be admitted into the perforation 7 via this insertion hole 8.

The sliding member 2 is molded in a generally tubular shape conforming with the section of the aforementioned cavity 5. It is admitted through the opening 9 of the cavity 5 at the lower end of the housing, advanced toward the depth of the cavity 5 as slid on the inner surface thereof and, on completion of the advance, left standing therein in a freely slidable condition.

This sliding member 2 is formed in a length equal to or greater than the depth of the cavity 5. Substantially halfway along the entire length thereof, the sliding member 2 is provided laterally therein with a perforation 10 of a vertically elongate elliptical section so that this perforation 10 may coincide with the perforation 7 of the housing. It is further provided laterally therein with an insertion hole 11 communicating to the perforation 10 so that the insertion hole 11 may coincide with the insertion hole 8 of the housing. In this embodiment, a partitioning piece 12 is extended from the edge of the insertion hole 11 across the space of the aforementioned perforation 10 to divide this space into two vertical halves including one half not communicating with the insertion hole 11. Shallow depressions 13 are formed by scraping the upper and lower portions of each of the openings of the perforation 10 in the opposite lateral sides of the sliding member. The partitioning piece 12 may be formed of a narrow platelike material with the opposite ends thereof supported in position diametrically on the inner surface of the perforation 10 as illustrated. It may be otherwise formed in the shape of a rod of a small diameter.

The housing 1 and the sliding member 2 which have been separately formed as described above are poised with their respective insertion holes 8, 11 in one coinciding direction. Then the sliding member is inserted in the direction of its upper end into the opening 9 of the cavity 5 and finally received slidably within the cavity 5. Prior to the insertion of the sliding member, the coil spring 3 is placed in the cavity of the housing, with one end of the spring set in position in the recess 6 and the other end thereof attached fast to a recess 14 which is formed in the upper end of the sliding member 2. As the coil spring 3 is brought into a compressed state between the two recesses 6, 14, it energizes the sliding member held inside the housing toward the opening 9.

In the present embodiment, for the purpose of preventing the sliding member received in the cavity 5 of the housing from being ejected out of the cavity by the energizing force of the spring, an engaging projection 15 of the shape of a check claw is formed as projected from the upper edge of the opening of the perforation 10. This projection 15 comes into fast engagement with the lower edge of the perforation 7 of the housing.

The use of the string fastener of this invention which is constructed as described above is accomplished by inserting one end of either of two given strings or one of the opposite ends of a given string 4 via one of the openings of the perforation 7 of the housing 1 into the enclosed half 10a of the perforation 10 divided by the partitioning piece 12 of the sliding member 2, drawing the end out of the other opening of the housing and then inserting the other end of the string sidewise via the insertion holes 8, 11 into the perforations 7, 10 of the housing and the sliding member.

Figure 2:
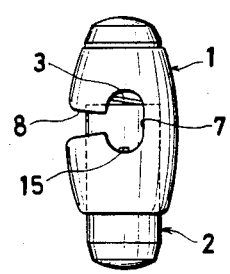
FIG. 2 is a side view of the same string fastener.
Figure 3:
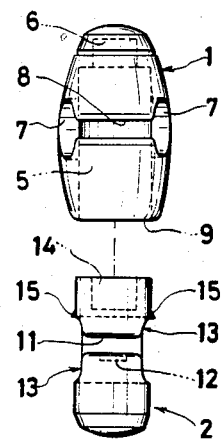
FIG. 3 is a front view of the same string fastener in its disassembled state.
Figure 4:
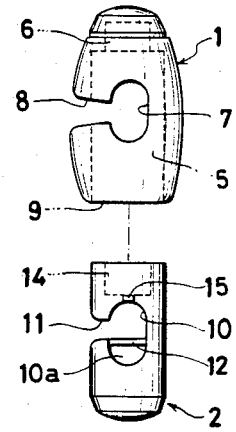
FIG. 4 is a side view of the same string fastener in the disassembled state.

While the string fastener of the present invention is in its normal condition, the sliding member 2 is pushed toward the opening 9 and the two perforations 7, 10 are deviated from each other as illustrated in FIGS. 1, 2 by the energizing force of the spring 3. In preparation for the insertion of the end portions of the string, therefore, the sliding member 2 is pushed inwardly against the energizing force of the spring until the perforations are brought into mutual coincidence. When the sliding member is relieved of the push after completion of the insertion of string, it is automatically pushed outwardly so much as to cause mutual deviation of the perforations 7, 10. Consequently, the string is nipped between the opposed edges of the openings of the perforations and, therefore, is prevented from producing any motion in the direction of its length. The string, thus, is secured in position by the string fastener of this invention.

In this case, the string is secured in position by being nipped between the opposed edges of the openings of the perforations 7, 10. The string can be secured more powerfully by the string fastener of this invention by causing the string to be bent in a zigzag pattern along the opposed edges of the openings besides having the string nipped as described above.

Figure 5:
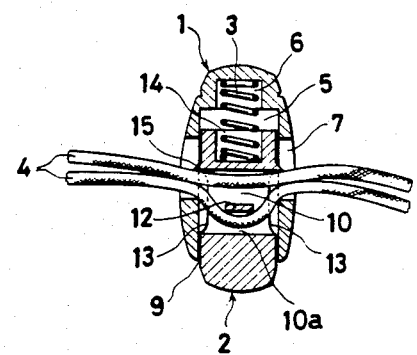
FIG. 5 is a centrally sectioned front view of the same string fastener in the state assumed during use.

The depressions 13 which are formed in the opposite lateral sides of the sliding member as described previously constitute themselves spaces for admitting the string. Owing to these depressions, the string is drawn in between the inner surface of the cavity 5 and the outer surface of the sliding member and held fast as bent in a zigzag pattern as illustrated in FIG. 5. In this case, the aforementioned engaging projection 15 also serves effectively as means for increasing the nipping force exerted upon the string.

Further owing to the partitioning piece 12 formed within the perforation 10 of the sliding member 2, the string is bent enough for the fastener to keep the string secured against any external force unexpectedly exerted on the string. Moreover, when the perforation 10 of the sliding member 2 and the perforation 7 of the housing 1 are brought into mutual coincidence for the purpose of relieving the string of the confinement by the fastener, this partitioning piece 12 keeps one end portion of the string held fast within the enclosed half 10a even when the other end portion of the string accidentally slips out of the insertion holes 8, 11 of the housing and the sliding member. Thus, it conveniently serves the purpose of keeping the string fastener on the string while the string fastener is being manipulated for adjustment of the fastening position of the string therein. This partitioning piece is not an indispensable element for the construction of this invention. The provision of the enclosed half 10a is not an essential requirement, either.

As described above, the string fastener of the present invention can relieve the string of its confinement by simply pushing the sliding member into the housing and it can secure the string in position by relieving the sliding member of the push thereby enabling the string to be nipped firmly between the opposed edges of the perforations of the housing and the sliding member. Thus, the string fastener can be operated with great ease to provide fast securement of the opposed end portions of a string. Since this string fastener can be freely moved along the length of the string, it has the advantage that the extent to which the skirt of a coat or the upper edge of a pouch is gathered along the string can be freely controlled.

The string fastener of this invention is integrally designed on the basis of the size of the perforations for passage of the string and the sliding stroke of the sliding member. Thus, it can be compactly constructed. Since it comprises only three components, namely, the housing, the sliding member, and the spring, it is easy to make and also easy to assemble as described above.

When the insertion holes 8, 11 are formed so as to diverge toward the outward openings and converge toward the inner openings to a width practically equalling the diameter of the string, they enable the string to be inserted easily into the perforations and secured safely within the perforations.

What is claimed is:

1. A string fastener, comprising a one-piece housing internally provided with a blind cavity opening in one end of said housing and said cavity having a substantially uniform configuration from one end to the other end, a sliding member having a complimentary external configuration to said cavity slidably admitted into said blind cavity of said housing, and a spring disposed within said cavity of said housing and serving to energize said sliding member outwardly, said housing and sliding member being respectively provided laterally therein with perforations adapted so as to come into mutual coincidence when said sliding member is pushed into said housing against the energizing force of said spring and said housing and sliding member also being respectively provided laterally therein with insertion slots adapted so as to communicate with said perforations and to come into mutual coincidence when said perforations are brought into mutual coincidence, at least one engaging projection in the shape of a check claw extending outwardly from the sliding member adjacent the upper edge of said opening of the perforation in said sliding member and projecting into the perforation in said housing and adapted to limit the axial sliding movement of said member by said projection engaging the lower surface of the perforation in said housing, wherein said string fastener secures a given string in position by causing said sliding member to be pushed into said housing until said perforations and said insertion holes come into mutual coincidence, inserting opposed end portions of said string via said insertion holes into said perforations, and relieving said sliding member of the pressure used for said pushing.

2. A string fastener according to claim 1, wherein a partitioning piece is diametrically extended horizontally across the space of said perforation of the sliding member from the lower inner edge of said insertion hole of said sliding member so as to divide said perforations into two vertical halves.

3. A string fastener according to claim 1, wherein shallow depressions are formed by scraping off opposed edge portions of each of the openings of the perforation in the opposite lateral sides of said sliding member.

4. A string fastener according to claim 2, wherein shallow depressions are formed by scraping off opposed edge portions of each of the openings of the perforation in the opposite lateral sides of said sliding member.

5. A string fastener according to claim 1, wherein a recess for receiving said spring is formed at the depth of the cavity in said housing and another recess similarly receiving said spring is formed at the leading end of said sliding member.

6. A string fastener according to claim 3, wherein a recess for receiving said spring is formed at the depth of the cavity in said housing and another recess similarly receiving said spring is formed at the leading end of said sliding member.

7. A string fastener according to claim 4, wherein a recess for receiving said spring is formed at the depth of the cavity in said housing and another recess similarly receiving said spring is formed at the leading end of said sliding member.

* * * * *